No. 851,584. PATENTED APR. 23, 1907.
W. S. BUNDY.
DISH WASHER.
APPLICATION FILED APR. 16, 1906.
2 SHEETS—SHEET 1.
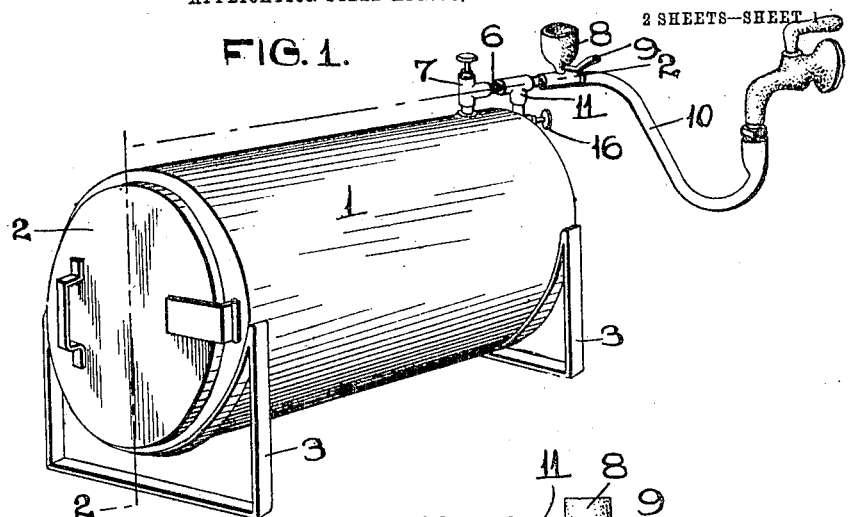
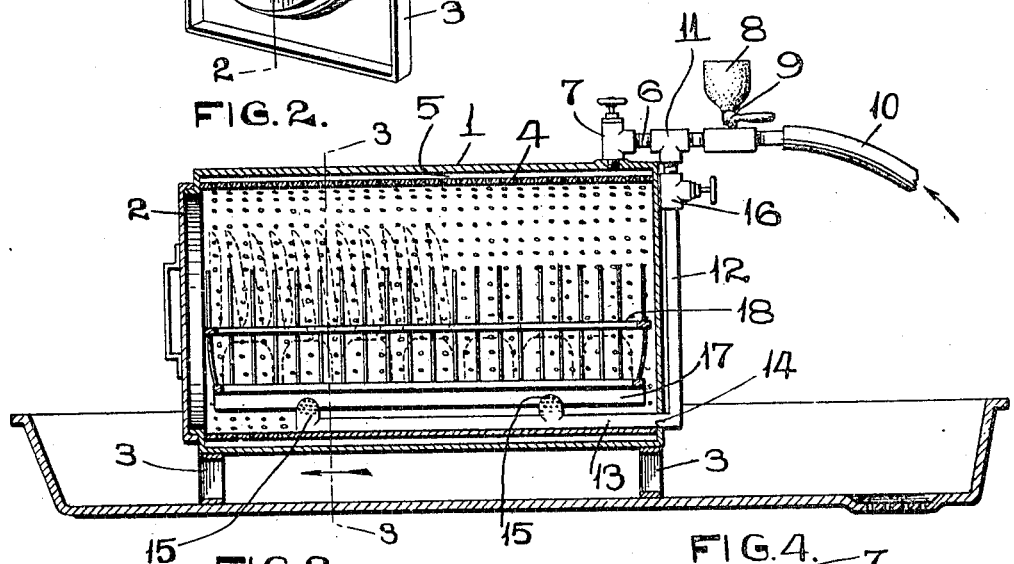
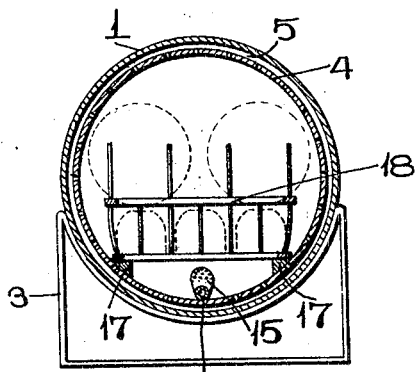
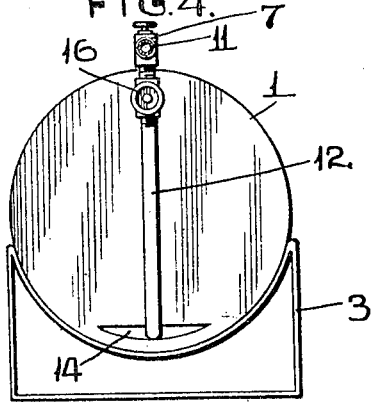
ATTEST.
H. J. Fletcher.
M. F. Smith.
INVENTOR.
WALTER S. BUNDY.
BY Higdon & Longan.
ATTY'S.

No. 851,584. PATENTED APR. 23, 1907.
W. S. BUNDY.
DISH WASHER.
APPLICATION FILED APR. 16, 1906.
2 SHEETS—SHEET 2.
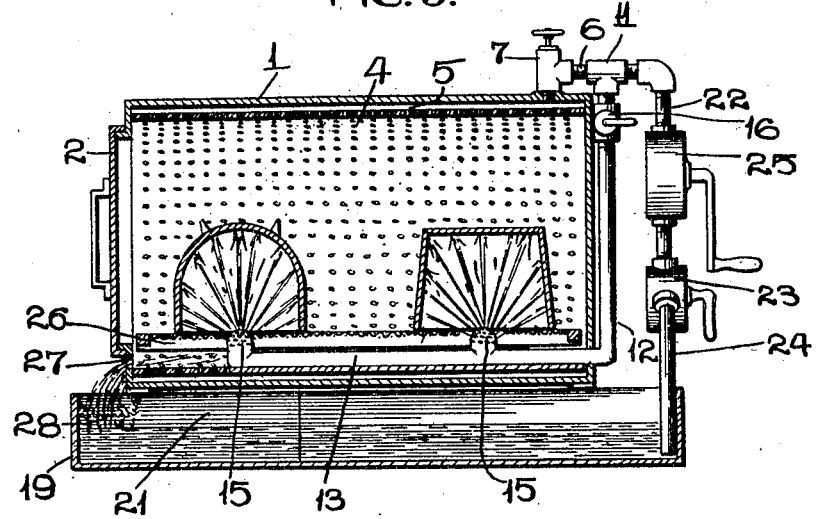
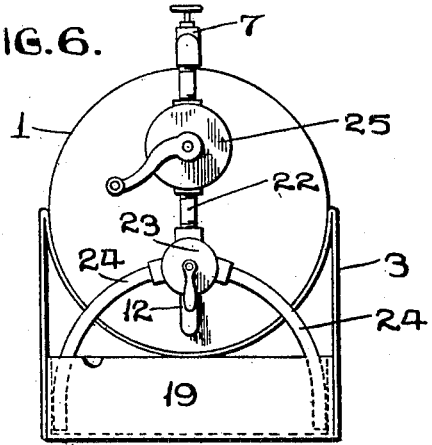
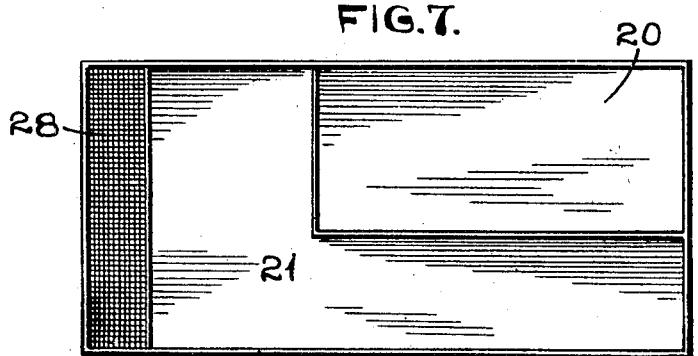
ATTEST.
H. J. Fletcher.
M. P. Smith
INVENTOR.
WALTER S. BUNDY.
BY Higdon & Longan
ATT'YS.

UNITED STATES PATENT OFFICE.

WALTER S. BUNDY, OF ST. LOUIS, MISSOURI.

DISH-WASHER.

No. 851,584.

Specification of Letters Patent.

Patented April 23, 1907.

Application filed April 16, 1906. Serial No. 312,047.

*To all whom it may concern:*

Be it known that I, WALTER S. BUNDY, a citizen of the United States, and a resident of St. Louis, Missouri, have invented certain new and useful Improvements in Dish-Washers, of which the following is a specification containing a full, clear, and exact description, reference being had to the accompanying drawings, forming a part hereof.

My invention relates to a dish washer; and the object of my invention is to construct a simple, inexpensive, and practically automatic apparatus for quickly and thoroughly washing dishes and culinary utensils.

A further object of my invention is to construct a simple apparatus which is adapted for use in the ordinary kitchen sink, and which utilizes hot water from the hot water tank in the kitchen.

A further object of my invention is to provide a dish washer with means whereby the dishes and utensils may be quickly placed within or removed from the housing of the apparatus.

To the above purposes, my invention consists of certain novel features of construction and arrangement of parts, which will be hereinafter more fully set forth, pointed out in my claims, and illustrated in the accompanying drawings, in which:—

Figure 1 is a perspective view of a dish washer of my improved construction; Fig. 2 is a vertical section taken on the line 2—2 of Fig. 1; Fig. 3 is a transverse section taken on the line 3—3 of Fig. 2; Fig. 4 is a rear elevation of the dish washer; Fig. 5 is a vertical section taken longitudinally through the center of a modified form of the dish washer; Fig. 6 is a rear elevation of this modification; Fig. 7 is a plan view of a pan made use of when this form of the washer is employed.

In the construction of my improved dish washer, I make use of an outer cylinder 1, the forward end of which is normally closed by a removable cover 2. The cylinder is horizontally disposed, and is supported by suitable legs 3. Arranged on the interior of the cylinder 1 is a perforated cylinder 4, which is slightly smaller in diameter than is said cylinder 1 in order to form a narrow annular chamber 5 between said cylinders 1 and 4. The rear end of the outer cylinder 1 is closed, and the inner cylinder is open at each end and abuts against the ends of the outer cylinder. Leading through the top of the cylinder 1 at the rear end thereof is a water supply pipe 6, in which is located a cut off valve 7. Located in the pipe 6, a short distance from the valve 7 is a cup 8, provided with a suitable cut-off valve 9, and which is adapted to receive a suitable liquid soap, or cleansing compound. A hose 10, leading from a suitable source of hot water supply is detachably seated on the outer end of the pipe 6. Connected by means of a T union 11 to the pipe 6 is a pipe 12, which extends downwardly against the rear end of the cylinder 1, and said pipe 12 is extended horizontally, as indicated by 13, through the center of a slot 14, which is formed in the rear wall of the cylinder, and said portion 13 of the pipe extends forwardly on the interior of the perforated cylinder 4. A plurality of short perforated nozzles 15 extend upwardly from this portion 13 of the pipe 12 on the interior of the perforated cylinder 4. Suitably located in the pipe 12 is a cut off valve 16.

A pair of rails 17 connected to and supporting a suitable rack 18 are arranged to slide longitudinally within the perforated cylinder 4, and said rack 18 is adapted to receive the dishes and utensils which are to be washed.

In the operation of my improved washer, the rack 18 is withdrawn from the perforated cylinder 4, and after the dishes are loaded into said rack, the same is positioned on the interior of the perforated cylinder 4, after which the cover 2 is placed in position to close the forward end of the washer, the valve 9 is now opened to allow the proper amount of liquid soap to discharge into the pipe 6, after which said valve 9 is closed, and as the valve 7 is opened, the hot water will discharge through the pipe 6 carrying the liquid soap therewith, and said hot water and soap will discharge into the cylinder 1. As the annular chamber between the two cylinders fills with hot water, the same will discharge through the minute apertures in the perforated cylinder 4, and will thus form a series of small jets which are directed against the dishes and utensils carried by the rack 18. The water discharging from the interior of the cylinder 4 passes out through the slot 14 in the rear wall of the cylinder 1. This action very quickly and thoroughly washes the dishes, and when the same are thoroughly cleansed, hot water is allowed to discharge onto the dishes for a short space of time to rinse and heat the same, thus materially assisting in drying said dishes after they have been removed from the washer. When desired, the valves 16 may be opened, which results in a discharge of the water from the perforated nozzles 15, which are arranged below the rack carrying the dishes.

Where it is desired to wash pots, kettles, and similar heavy utensils, the rack 18 is dispensed with, and a rectangular frame 26 which is covered with suitable wire screen is positioned within the inner cylinder, and the pots or kettles are inverted upon this frame immediately over the nozzles 15.

In the modification seen in Figs. 5, 6, and 7, I make use of a pan 19, having a compartment 20 for clear water, and a compartment 21 for soapsuds. The pipe 6 is connected to a vertically arranged pipe 22, the lower end of which is connected by a two-way valve 23 to branches 24 which extend downwardly, and the lower end of one of said branches enters the compartment 20, and the lower end of the opposite branch enters the compartment 21. Located in the pipe 22 is a small rotary pump 25, of any suitable construction, and which is adapted to draw water up through the branches 24, and force the same up through the pipe 6 into the annular chamber between the cylinders 1 and 4. The water from this form of the washer discharges through an opening 27 in the front end of the cylinder 1, and arranged in the front end of the pan 19 is a screen section 28, through which the water passes in discharging from the aperture 27 into the compartment 21. This form of the washer is adapted for use where the supply of hot water is limited; and to operate the washer, a supply of clear hot water is located in the compartment 20, and a supply of soapsuds in the compartment 21. The dishes or utensils to be washed are now located on the rack 8 or frame 26, and, after the two-way valve has been properly set, the pump 25 is manually operated, and the water is drawn up from the pan and forced through the pipe 6, or through the pipes 12 and 13. Thus, the same supply of soapsuds or clear water can be used continuously in washing or rinsing the dishes.

A dish washer of my improved construction is simple, strong, and durable, can be quickly loaded or unloaded, and the dishes placed in the perforated cylinder are quickly and thoroughly cleansed.

I claim:

1. In a dish washer of the class described, an outer cylinder, an inner perforated cylinder, means whereby dishes are held within the perforated cylinder, means whereby water under pressure is delivered to the annular chamber between the cylinders, and means whereby cleansing compound is discharged into the water in advance of its discharge into the annular chamber; substantially as specified.

2. In a dish washer of the class described, an outer cylinder, an inner perforated cylinder, there being an annular chamber formed between said cylinders, which chamber is closed at the ends of the cylinders, a removable cover closing one end of the outer cylinder, a dish rack removably positioned within the perforated cylinder, a pipe leading to the annular chamber, and a branch pipe leading through the rear end of the outer cylinder to the interior of the inner cylinder; substantially as specified.

3. In a dish washer of the class described, an outer cylinder, an inner perforated cylinder, means whereby dishes are held within the perforated cylinder, means whereby water under pressure is delivered to the annular chamber between the cylinders, means whereby cleansing compound is discharged into the water in advance of its discharge into the annular chamber, and means whereby the discharge of water and cleansing compound to the cylinder is controlled; substantially as specified.

In testimony whereof, I have signed my name to this specification, in presence of two subscribing witnesses.

WALTER S. BUNDY.

Witnesses:
M. P. SMITH,
E. E. LONGAN.